United States Patent
Caveney et al.

(10) Patent No.: US 6,584,267 B1
(45) Date of Patent: Jun. 24, 2003

(54) CABLE MANAGEMENT SYSTEM

(75) Inventors: Jack E. Caveney, Hinsdale, IL (US); Dale A. Block, Schererville, IN (US)

(73) Assignee: Panduit Corp., Tinley Park, IL (US)

( * ) Notice: Subject to any disclaimer, the term of this patent is extended or adjusted under 35 U.S.C. 154(b) by 398 days.

(21) Appl. No.: 09/586,238

(22) Filed: Jun. 2, 2000

(51) Int. Cl.⁷ ............................................. G02B 6/00
(52) U.S. Cl. .................................. 385/134; 385/135
(58) Field of Search ............................... 385/134–147; 124/48, 50

(56) References Cited

U.S. PATENT DOCUMENTS

| | | | |
|---|---|---|---|
| 4,158,754 A | 6/1979 | Yonezaki et al. ............. 179/98 |
| 4,665,546 A | 5/1987 | Brey et al. ................. 379/327 |
| 4,776,662 A | 10/1988 | Valleix | |
| 4,898,448 A | 2/1990 | Cooper | |
| 5,138,688 A | 8/1992 | Debortoli ................... 385/135 |
| 5,339,379 A | 8/1994 | Kutsch et al. .............. 385/135 |
| 5,363,465 A | 11/1994 | Korkowski et al. ......... 385/135 |
| 5,448,015 A | 9/1995 | Jamet et al. ............... 174/68.3 |
| 5,458,019 A | * 10/1995 | Trevino ................. 385/134 X |
| 5,497,444 A | 3/1996 | Wheeler ...................... 385/135 |
| 5,530,954 A | 6/1996 | Larson et al. ............... 385/135 |
| 5,546,495 A | 8/1996 | Bruckner et al. ........... 385/135 |
| 5,613,030 A | 3/1997 | Hoffer et al. ............... 385/135 |
| 5,640,482 A | 6/1997 | Barry et al. ................. 385/135 |
| 5,689,604 A | 11/1997 | Janus et al. ................. 385/134 |
| 5,715,348 A | 2/1998 | Falkenberg et al. ......... 385/135 |
| 5,758,002 A | * 5/1998 | Walters ....................... 385/134 |
| 5,758,003 A | 5/1998 | Wheeler et al. ............. 385/134 |
| 5,788,087 A | 8/1998 | Orlando ........................ 211/26 |
| 5,836,551 A | 11/1998 | Orlando ........................ 248/49 |
| 5,898,129 A | 4/1999 | Ott et al. ....................... 174/59 |
| 6,362,422 B1 | * 3/2002 | Vavrik et al. ............ 439/535 X |

* cited by examiner

*Primary Examiner*—Lynn D. Feild
*Assistant Examiner*—Son V. Nguyen
(74) *Attorney, Agent, or Firm*—Robert A. McCann; Jay A. Saltzman; Christopher S. Clancy

(57) ABSTRACT

The invention is an improved cable management system having an open frame, such as a telecommunications network rack, a plurality of enclosures for containing fiber optic equipment secured to the frame, at least one cable trough assembly defining a primary horizontal cable pathway, cable fanning guides secured to at least some of the enclosures, and a plurality of cable rings defining a primary vertical cable pathway to collect and route cable emerging from the fanning guides. Additionally, the invention may include a plurality of transverse cable troughs defining a plurality of secondary horizontal cable pathways, a second plurality of cable rings defining secondary vertical cable pathways to collect and route cable to the transverse cable troughs and a slack cable management system having a plurality of spools secured along the frame to receive slack cable.

55 Claims, 11 Drawing Sheets

CABLE MANAGEMENT SYSTEM

RELATED APPLICATIONS

This disclosure is related to the following U.S. patent applications filed on the same date as this application, each of which is owned by the assignee of this application, and the entirety of each of which is hereby incorporated herein by reference:

U.S. Patent Application entitled "Modular Latch and Guide Rail Arrangement for Use in Fiber Optic Cable Management Systems," naming Samuel M. Marrs, Robert R. Brown and John J. Bulanda as inventors.

U.S. Patent Application entitled "Slack Cable Management System," naming Jack E. Caveney as an inventor.

U.S. Patent Application entitled "Improved Enclosure for Use in Fiber Optic Management Systems," naming Michael T. Vavrik and Philip B. Chandler, Jr. as inventors.

U.S. Patent Application entitled "Vertical Cable Management System," naming Samuel M. Marrs, Michael T. Vavrik, and Jeff Paliga as inventors.

U.S. Patent Application entitled "Universal Mounting System for a Fiber Optic Management Center," naming Michael T. Vavrik and Philip B. Chandler, Jr. as inventors.

FIELD OF THE INVENTION

The present invention relates to improved methods and apparatus for managing fiber optic connections and fiber optic cables as part of a fiber optic communication system. More particularly, the present invention relates to a system for managing and routing fiber optic cable, especially in a high connection-density application such as a telecommunications operations center, wherein numerous in-coming and out-going fiber optic cables meet at a central access point.

BACKGROUND OF THE INVENTION

Within recent years, there has been a rapidly increasing development and use of telecommunications in business and personal activities. Simultaneously, there has been an accelerating trend toward "convergence" in the telecommunications industry. That is, many historically distinct forms of telecommunications, e.g., telephone, data transmission, e-mail, radio, television, videoconference, internet access, and on-line applications, are being combined into a single channel of communication. This combination of factors is causing a paradigm shift in the amount of bandwidth necessary for telecommunications service to modem office buildings. The increased bandwidth requirements cannot be effectively satisfied by traditional copper cables, but, instead, requires switching to fiber optic cable.

Although much attention has been paid to the electrical and-electronic techniques for using the bandwidth in fiber optic cable and for interconnecting the signals of copper cable and fiber optic cable, relatively less attention has been given to the unique physical needs of handling, connecting, and maintaining fiber optic cable. However, the mechanical devices that have been developed for handling copper cable do not work well for fiber optic cable because of the relatively delicate, yet technically precise nature of fiber optic cable.

For example, unlike copper cable,-fiber optic cable cannot be readily cut and spliced on demand to make a desirable connection fit in the field. Rather, fiber optic cable is purchased in predetermined lengths, with connectors that have been installed in the factory. Field workers must utilize these predetermined lengths of cable, regardless whether the length is appropriate for the task at hand. When both ends of a fiber optic cable are connected to equipment at two separate points, a certain amount of slack cable is created, as the necessary result of the use of predetermined lengths of cable. Such slack cable ideally should be contained within a limited amount of space, preferably as close to the termination points as possible. At the same time, the relatively fragile and delicate nature of fiber optic cable prohibits bundling excess cable as might be done with copper cable. If fiber optic cable is excessively bent or stressed, the signal within may become seriously disrupted.

Moreover, it must be recognized that an operations center, such as occurs in the field of this invention, typically houses hundreds (and sometimes thousands) of fiber optic cables. It is particularly important that such an operations center provide for installing the fiber optic cables in a manner that secures and protects any excess fiber optic cable without compromising its relatively delicate nature. Yet, in the event that equipment is changed or moved, each individual fiber optic cable must also be maintained in such a manner that it can be identified, isolated, and retrieved without unduly disturbing other fiber optic cables.

These considerations are made all the more acute by the need to increase the number of connections that may be accommodated in a given area. As the connection density increases, the resulting cable congestion becomes a problem, as more and more cables are routed across the system. Therefore, there is a need in the industry for a cable management system that is capable of accommodating the large number of cables necessary to support high connection-density equipment.

It should also be recognized that a fiber optic cable may be connected to a variety of different type devices which are also housed in the operations center, i.e., patch panels of different sizes, splice drawers, connector modules, etc. There is a need within the industry for a fiber optic cable management system that may facilitate the substitution and replacement of one such device by another, without the need to remove or reinstall all of the fiber optic cable associated with the original device. For example, such devices have historically been assembled in racks that are bolted to the floor of the communications center. Furthermore, when it is necessary to upgrade or repair equipment, maintaining system operation during these procedures is an important consideration. Consequently, there is need in the prior art for a cable management system organized in a manner that allows for system operation during upgrading or maintenance.

The foregoing problems are made even more difficult because the operations center actually typically comprises a three-dimensional array of devices and fiber optic cables. That is, the operations center typically houses many columns and rows of such racks, with each rack containing a vertical array of devices attached to hundreds and possibly thousands of such fiber optic cables. Each such cable must be identifiable, retrievable, and replaceable, without disrupting the surrounding cables.

Finally, it must be recognized that all of the foregoing problems exist in a commercial environment without a single established standard for size. Historically, products within the "public network" were designed by AT&T and Western Electric, and utilized racks that were 23 inches wide, holding devices and enclosures that were 19 inches wide. The "public network" was then connected at some point to the premises in a particular building. Products intended for a "premises network" were historically based upon racks that were 19 inches wide, holding devices and enclosures that were 17 inches wide. The Telecommunications Act of 1996 has opened and triggered widespread competition within the telecommunications market. However, it has done so without establishing standards vis-à-vis the mechanical aspects of an operations center. Different companies are adopting different physical standards, and the line of demarcation between "public network" and "premises network" products is becoming fragmented and blurred. As a result, there is a particular need for products that can solve the foregoing problems in the context of both public network and premises network environments.

SUMMARY OF THE INVENTION

The above discussed and other drawbacks and deficiencies of the prior art are overcome or alleviated by the cable management system of the present invention. In accordance with the present invention, the cable management system comprises an open frame having a pair of sidewalls extending vertically, the sidewalls connected at a first end by a base and at a second end by a top wall, a plurality of enclosures secured to the sidewalls to contain fiber optic equipment, at least one cable fanning guide secured to at least one enclosure to control routing of cable emerging from the enclosure, a plurality of cable rings spaced vertically along at least one of the sidewalls, defining a primary vertical cable pathway, and at least one cable trough assembly secured to the frame, the cable trough assembly defining, with cable troughs of contiguous other systems, a primary horizontal cable pathway. In another embodiment, the system has first and second surfaces, and the invention further comprises at least one transverse cable trough and, preferably, a plurality of transverse cable troughs spaced vertically along the frame on the second surface of the system, defining, with the transverse cable troughs of contiguous other systems, at least one and, preferably a plurality of secondary horizontal cable pathways traversing the second surface of the system. Additionally, the invention may comprise a second plurality of cable rings defining a secondary vertical cable pathway on the second surface of the system. Further, the system may include a channel between the enclosure and an adjacent transverse trough useful for conducting cable that enters the system from above, such as, by way of example only, intra-facility cables that are routed across the ceiling of the room in which the system is located, into or out of the cable pathways of the system.

The cable trough assemblies and enclosure mounting brackets each include an opening or aperture through which cable may pass from the first surface of the system to the second surface of the system, allowing the field technician to route cable between multiple combinations of the primary and secondary vertical and horizontal cable pathways. The combination of cable pathways made possible by the trough assemblies, transverse troughs and the vertical cable pathways provides a high degree of organization, allowing for the use of very high connection density, while minimizing the problems of cable congestion resulting from the high density of connections.

These and other features and advantages of the invention will be apparent to those skilled in the art upon review of the following detailed description of preferred embodiments and drawings.

DETAILED DESCRIPTION OF THE DRAWINGS AND PREFERRED EMBODIMENTS

Figure 1:
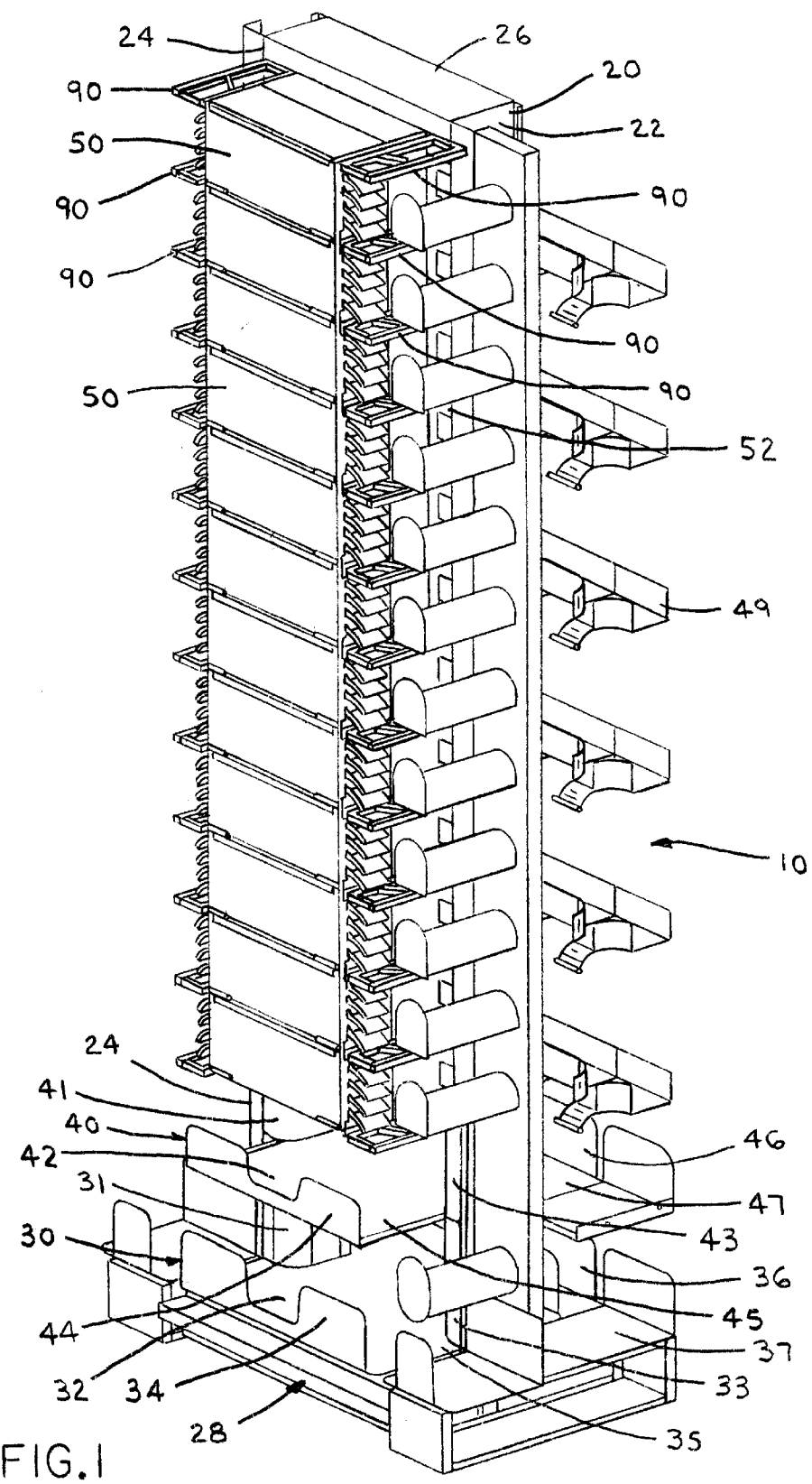
FIG. 1 is perspective view of a cable management system according to the invention.
Figure 2:
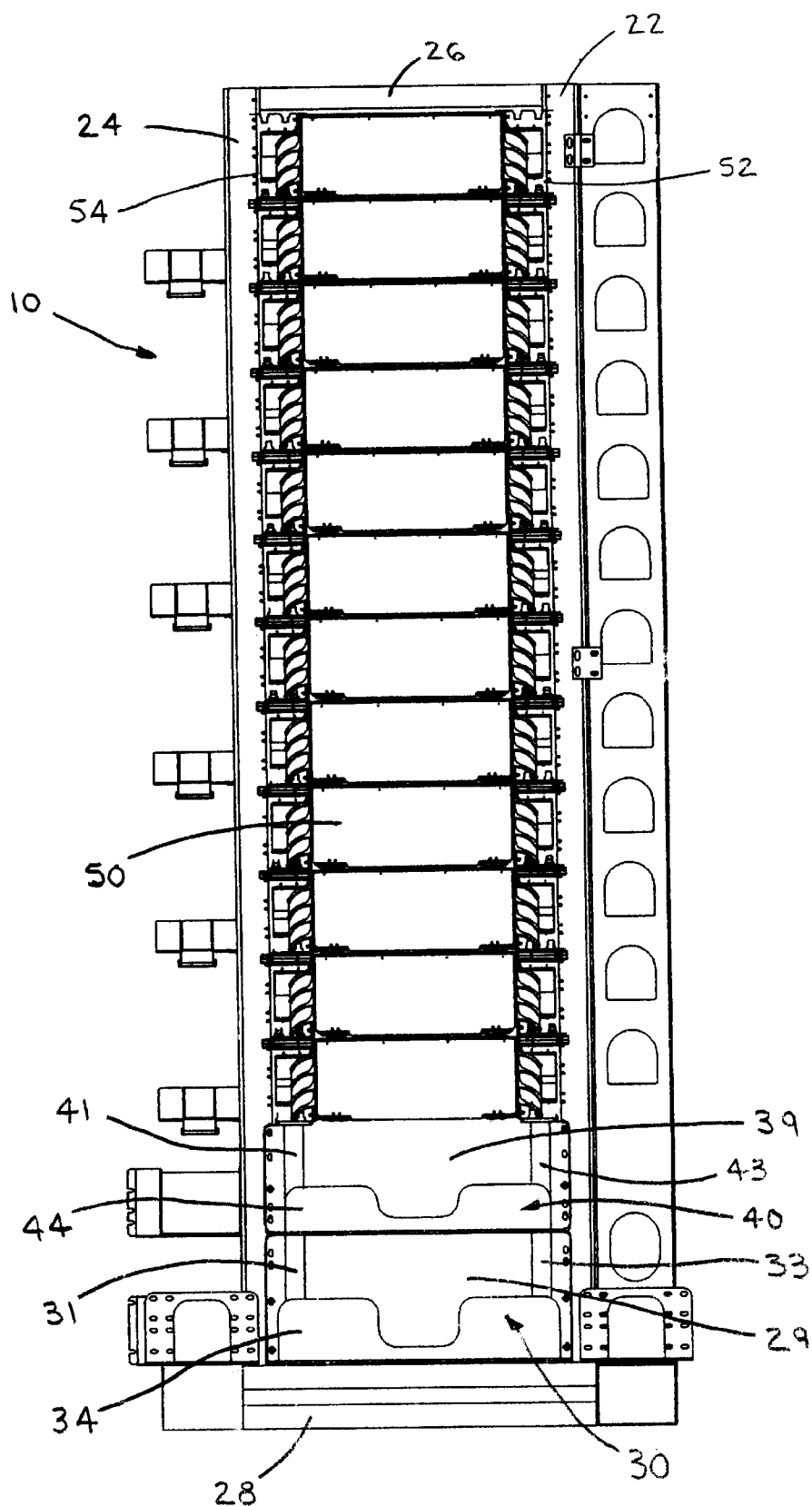
FIG. 2 is a front view of a cable management system according to the invention.

FIGS. 1 and 2 depict a preferred embodiment of the invention, wherein a cable management system 10 includes an open frame 20 having spaced apart vertical side walls 22, 24, connected at one end by a top wall 26 and connected at another end by a base 28 that may be secured to a floor surface (not shown), and defining first and second surfaces of the system. In a preferred embodiment, the first and second surfaces are the front and rear surfaces, respectively, of the system, although other alternative arrangements are possible. Generally, the frame 20 is a conventional telecommunications network rack. A plurality of enclosures 50 are secured to the side walls 22, 24 by mounting brackets 52, 54. The function of the enclosure 50 is to contain fiber optic equipment, such as, for example, connector modules that are used to connect cables running from one enclosure 50 to another, either on the same or different frames 20.

Figure 3:
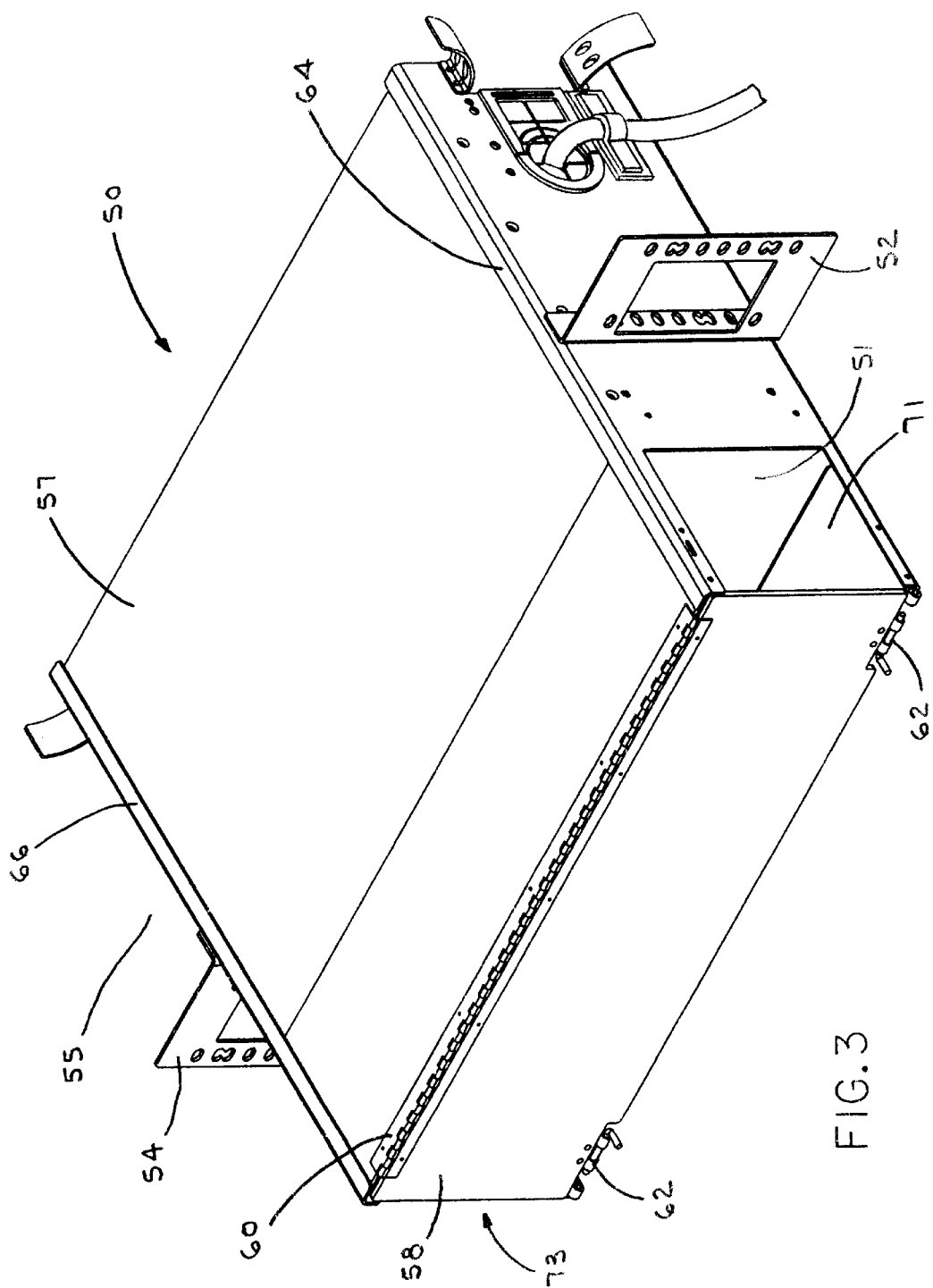
FIG. 3 is a perspective view of an enclosure.

As may be seen in FIG. 3, the enclosure 50 is substantially rectangular, having a floor 51, side walls 53, 55 and a top wall 57, defining a front opening (not shown) and a rear opening not shown), the front opening covered by an enclosure cover 58 and the rear opening covered by rear cover (not shown). The enclosure is the subject of a U.S. Patent Application entitled "Improved Enclosure for Use in Fiber Optic Management Systems," filed concurrently herewith and hereby incorporated by reference. In a preferred embodiment, the cover 58 is made of a clear or semi-transparent material, such as Lexan®. The enclosure cover 58 includes a cover hinge 60 and cover latches 62. Cover guide rails 64, 66 are secured to the top wall 57 and act as guides through which the cover 58 slides-when opened. Optionally, a detent (not shown) may be included that prevents the cover 58 from sliding too far to the rear when opened. At an end of each sidewall 53, 55 adjacent the enclosure cover an opening 71, 73 to accommodate a fanning guide array is defined. Cables terminating in the enclosure 50 pass through the openings 71, 73 and over the fanning guide array as discussed in-detail below.

Figure 4:
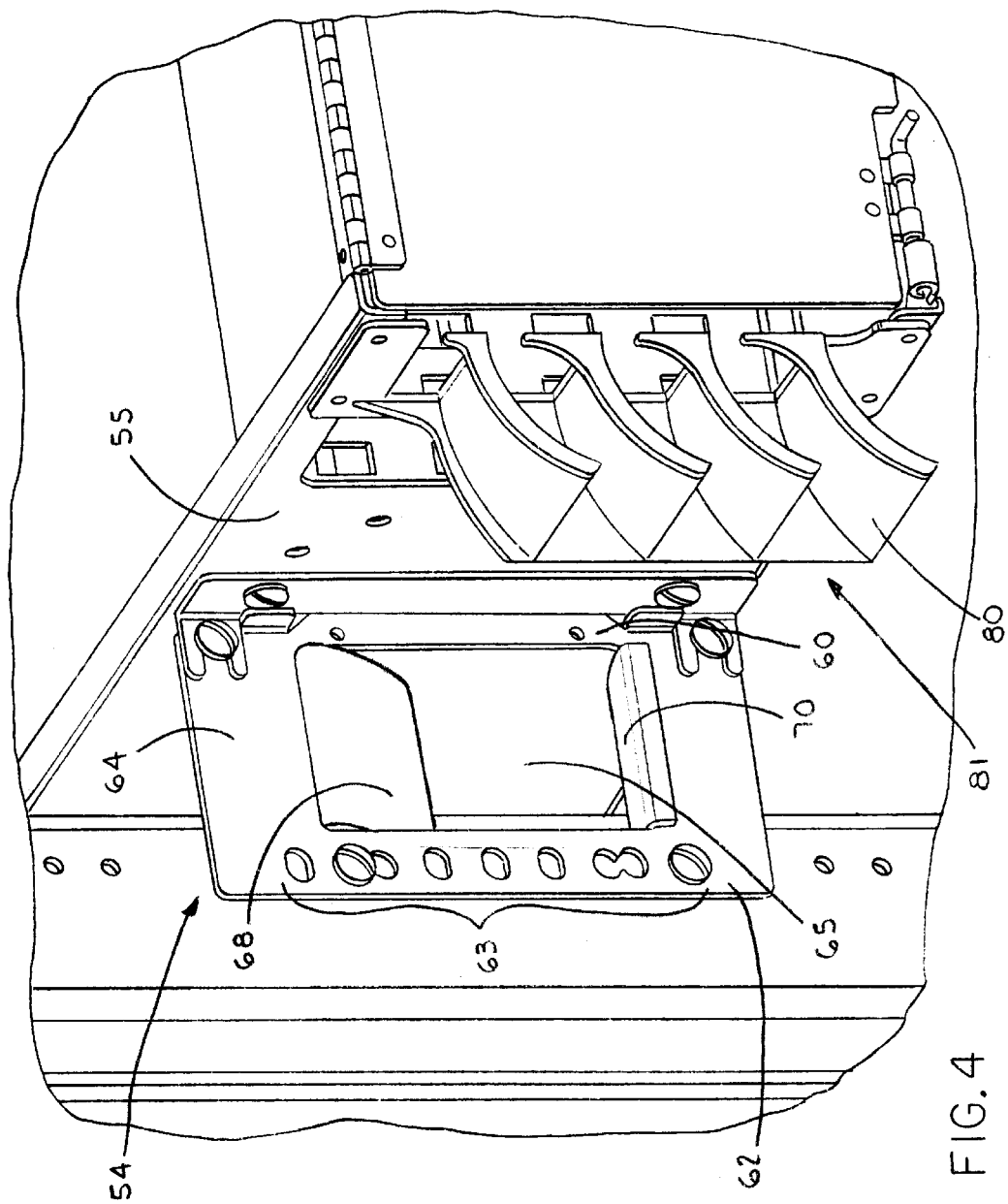
FIG. 4 is a detailed view of a fanning guide and mounting bracket secured to an enclosure.

Referring now to FIG. 4, mounting bracket 54 includes an inner leg 60 and an outer leg 62 connected by first and second cross-pieces 64, 66, defining an aperture 65 through which cable may pass from the first surface of the frame to the second surface of the frame. Inner leg 60 mounts to enclosure 50, while outer leg 62 includes a universal mounting pattern 63 through which bolts may be used to secure the outer leg 62 to frame 20. The universal mounting pattern 63 allows for mounting to any standard frame 20, including EIA/TIA and WECO frames. In the preferred embodiment shown in FIG. 4, aperture 65 is equipped with bend radius control fittings 68, 70 to control the bending of cable passing therethrough. In this preferred embodiment, the bend radius control fittings are curved members that function to create a gradual directional transition in cable upon which a direction change is imposed as, for example, when cable that is traversing a system 10 in a horizontal direction is routed vertically. The mounting brackets are the subject of a U.S. Patent Application entitled "Universal Mounting System for a Fiber Optic Management System," filed concurrently herewith and hereby incorporated by reference.

Referring again to FIGS. 1 and 2, secured to and between the sidewalls 22, 24 is a first trough assembly 30 and, preferably, a second trough assembly 40 for carrying cables that traverse the frame 20 horizontally. Each trough assembly 30, 40 includes a floor 32, 42 and a first and second trough flange 34, 36 and 44, 46 to secure the cables within upper and lower main cable troughs 35, 45 on the first surface of the system 10 and upper and lower main cable troughs 37, 47 on the second surface of the system 10. The four main cable troughs 35, 45 and 37, 47 define, with similar cable troughs on adjacent systems 10, four primary horizontal cable pathways for carrying cable traversing the system 10 horizontally. The cable trough assemblies 30, 40 include a central opening 29, 39 that allows for the passage of cable through the frame 20, allowing cable to be routed between any of the four primary horizontal cable pathways. In order to prevent excessive bending of cable passing through the central opening 29, 39, the cable trough assemblies 30, 40 include bend radius control fittings 31, 33, and 41, 43. A plurality of transverse cable troughs 49 are spaced vertically upwards along the second surface of the system 10, defining, with similar transverse troughs on adjacent systems 10 a plurality of secondary horizontal cable pathways.

Figure 5:
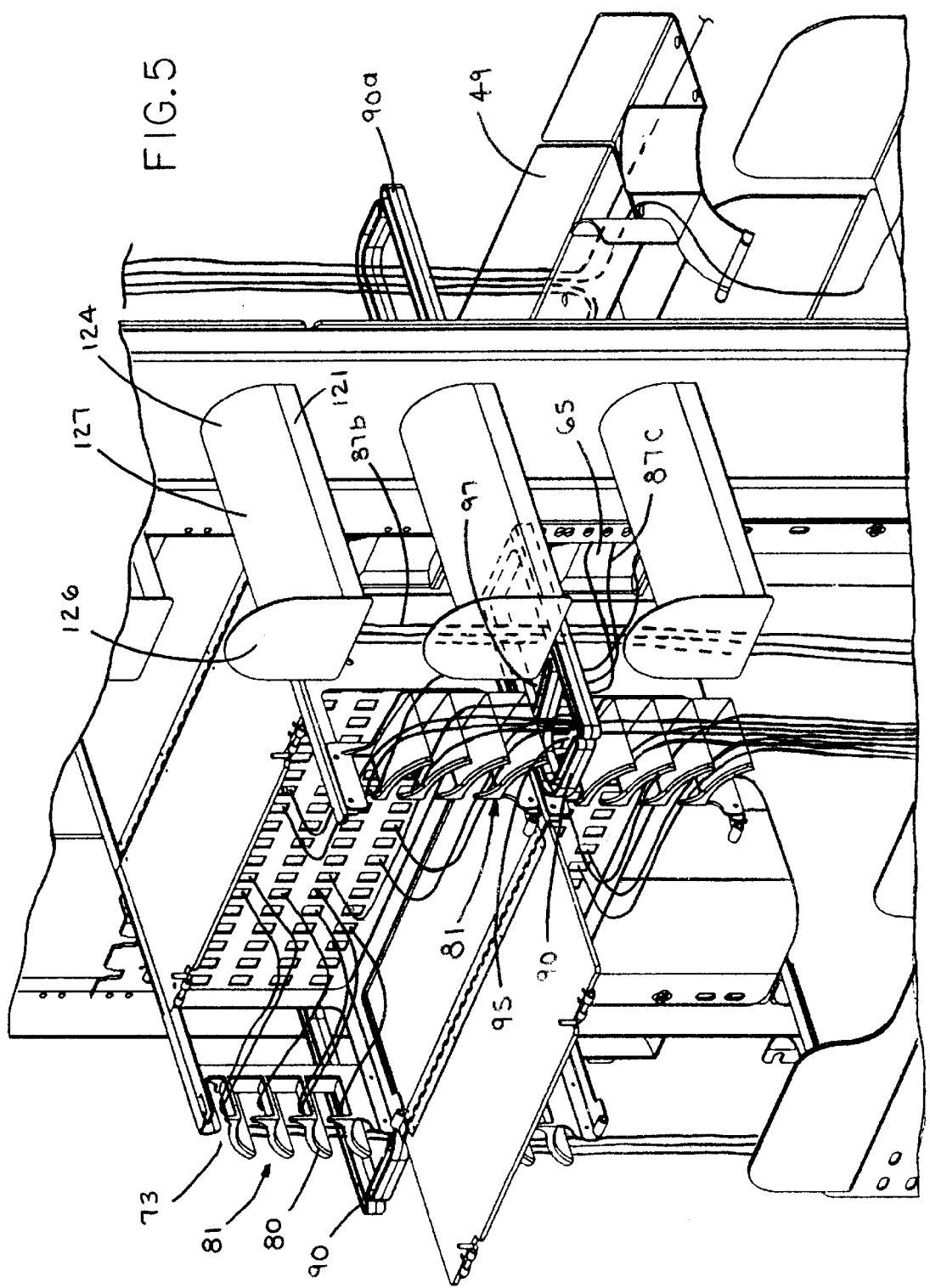
FIG. 5 is a perspective view illustrating the cable pathways of the invention.
Figure 6:
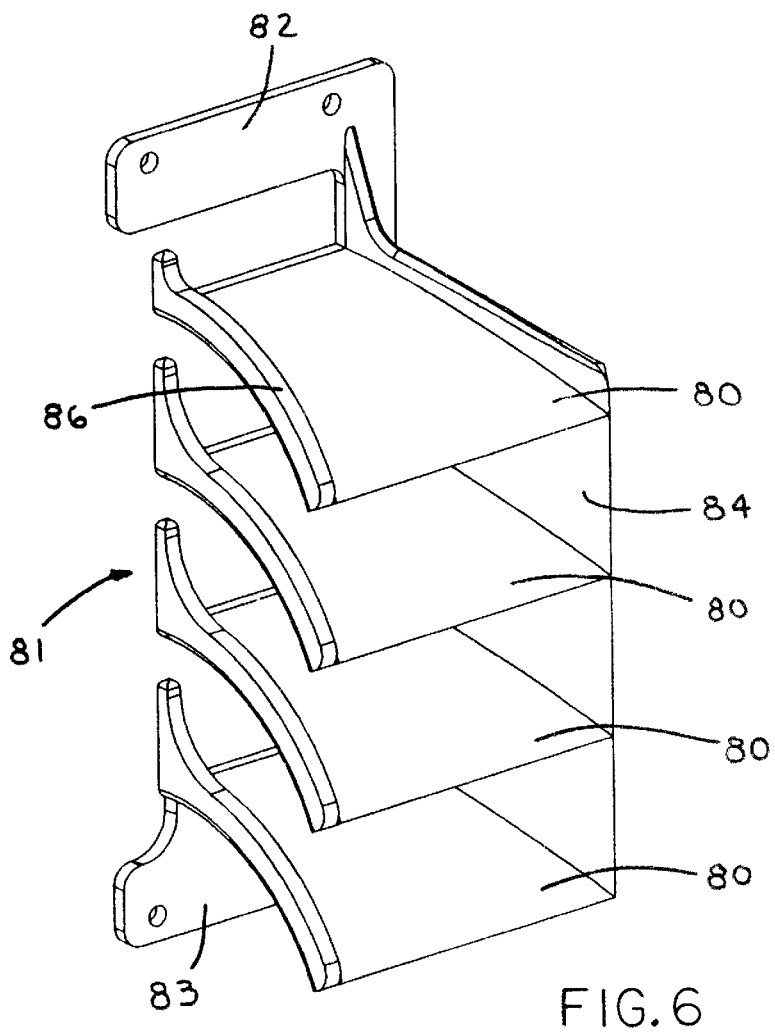
FIG. 6 is a perspective view of a fanning guide array.

Referring to FIGS. 5 and 6, cable 87 that terminates in an enclosure 50, is directed downward in the direction of the primary cable pathways through a primary vertical cable pathway on the first surface of the system 10. As the cable 87 emerges from the enclosure 50 through opening 71 or 73, it is directed over a fanning guide 80 that acts to control the bend radius of the cable as it is directed downwards and to control the placement of the cable into the vertical cable management system. A series of fanning guides 80 forming a fanning guide array 81 is secured to the side walls 53, 55 of the enclosure 50, adjacent openings 71, 73. A fanning guide array 81 is shown in FIG. 6, comprising a plurality of fanning guides 80, with a peripheral wall 84 and first and second mounting rails 82, 83. In a preferred embodiment, the peripheral wall 84 curves away from the fanning guides, and the mounting rails 82, 83 are plates that bolt onto the sidewalls 53, 55 of the enclosure 50. Each fanning guide 80 includes an edge flange 86 located on an edge of the fanning guide 80 opposite the peripheral wall 84 to prevent cable passing over the fanning guide 80 from slipping off the fanning guide 80.

Figure 7:
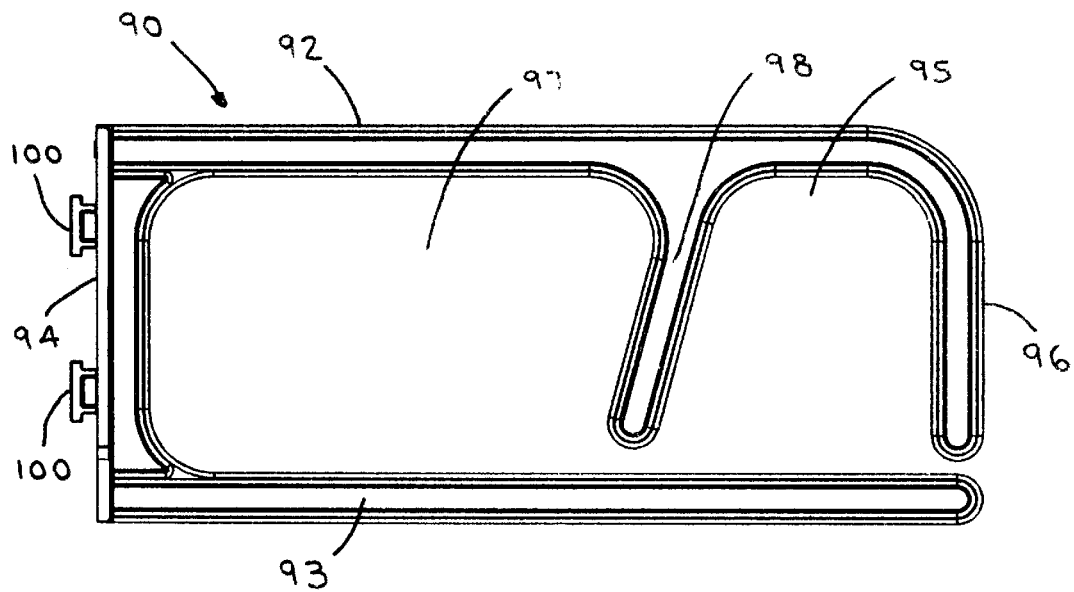
FIG. 7 is a perspective view of a cable management ring.

Referring now to FIGS. 1, 5 and 7, the vertical cable pathway is defined by a plurality of cable rings 90. Although the cable rings 90 could be simple ring-shaped members defining a single channel, in a preferred embodiment, the cable rings 90 are in the form depicted in FIG. 7, wherein the cable ring 90 includes first and second legs 92, 93, connected by an end wall 94. First leg 92 includes a terminal projection 96 and an intermediate projection 98, defining first and second channels 95, 97. In a preferred embodiment, shown in FIG. 7, the intermediate projection 98 is slightly inclined toward the end wall 94 and away from the terminal projection 96, although the intermediate projection 98 could be parallel to the terminal projection 96. Mounting means 100 are positioned on the end wall 94.

In a preferred embodiment, cable ring 90 is attached to each enclosure mounting bracket 52, 54, locating the cable ring 90 adjacent the enclosure 50, with the first channel 95 located adjacent the fanning guide array 81. Alternatively, the cable rings 90 could be attached directly to the frame 20 or to any convenient anchor site. Typically, the cable rings 90 are spaced at intervals along the frame 20 to coincide with the spacing of the enclosures 50 stacked along the frame 20, adjacent the openings 71, 73 in sidewalls 53, 55 of each enclosure 50. Accordingly, a primary vertical cable pathway is defined by a plurality of stacked cable rings 90 located on both sides of each enclosure 50, that is, positioned adjacent both sidewalls 53, 55 of each enclosure 50. This is necessary so that cable may enter or exit the enclosure 50 through either opening 71 or opening 73, increasing the efficiency of cable routing. Cable passing over the fanning guide array 81 is directed downwards into the first channel 95. As the cable continues downwards through a plurality of vertically stacked cable rings 90, the accumulating cables may be routed behind intermediate projection 98 into the second channel 97.

A secondary vertical cable pathway may be included, defined by a second plurality of cable rings 90a spaced vertically along the frame 20 on the second surface of the system 10 to control and route cable routed vertically to the secondary cable pathways defined by the transverse cable troughs 49. As with the primary vertical cable pathway, a secondary cable pathway is defined on both sides of the enclosures, i.e., adjacent the sidewalls 53, 55, on the second surface of the system 10. FIG. 5 also shows the interaction of the vertical and horizontal cable pathways to carry and direct cable 87 emerging from the enclosure 50. As cable 87 emerges from the enclosure 50 it is directed over the fanning guides 80 of a fanning guide array 81, thereby providing bend radius control as the cable 87 is routed downwards toward the primary horizontal cable pathways. As the cable 87 leaves the fanning guides 80 the cable 87 is collected and controlled by cable ring 90, passing through the first channel 95 thereof. Cable 87b from enclosures 50 secured higher on the frame 20 passes through second channel 97. Additionally, some cable 87c is routed through aperture 65 in mounting bracket 52, to the secondary horizontal cable pathway defined by transverse cable trough 49. Furthermore, cable 87d is vertically routed between different transverse cable troughs 49 through a secondary vertical cable pathway defined by a second plurality of rings 90a, located on the second surface of the system 10.

Figure 8:
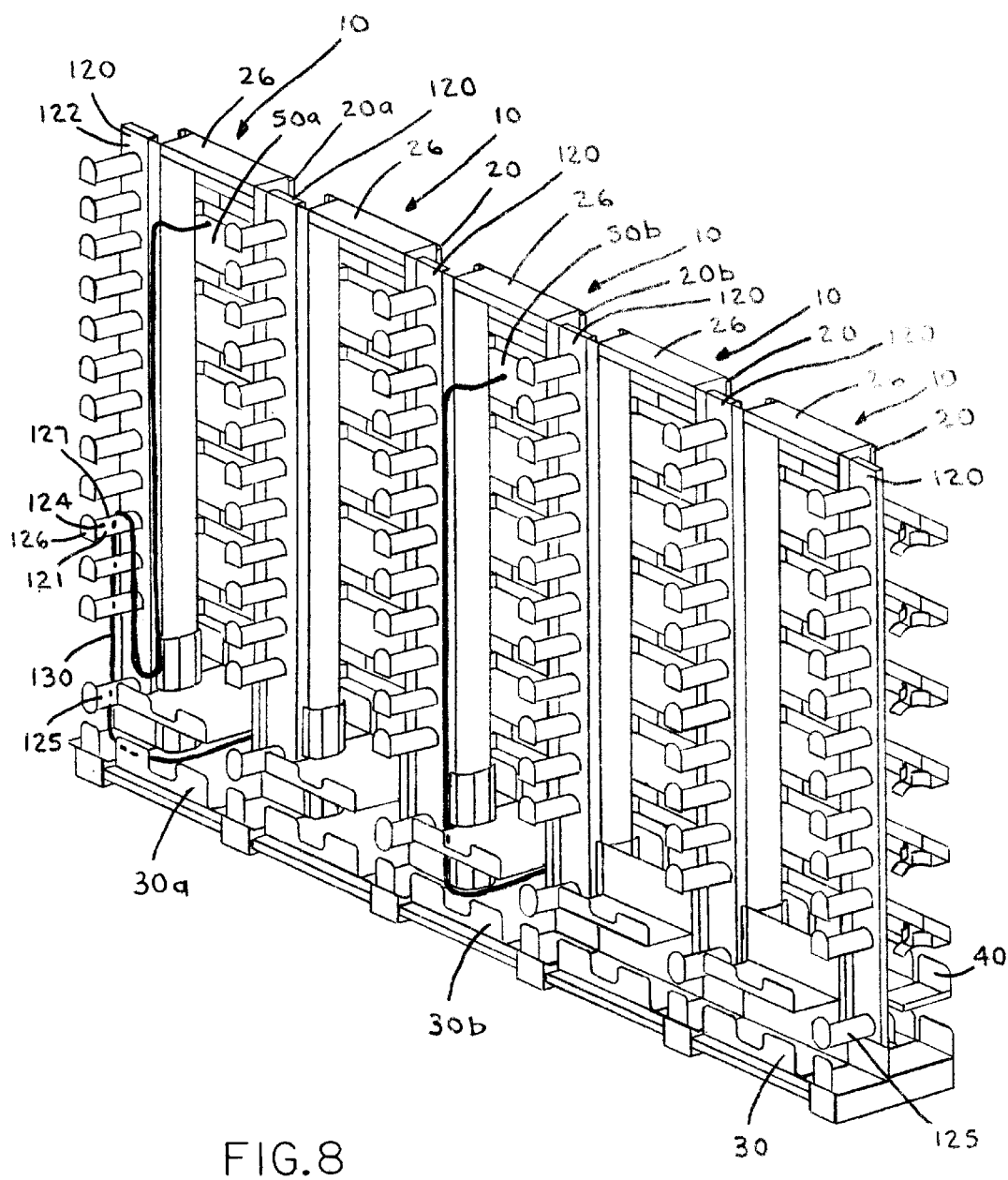
FIG. 8 is a perspective view of a series of cable management systems according to the invention.
Figure 9:
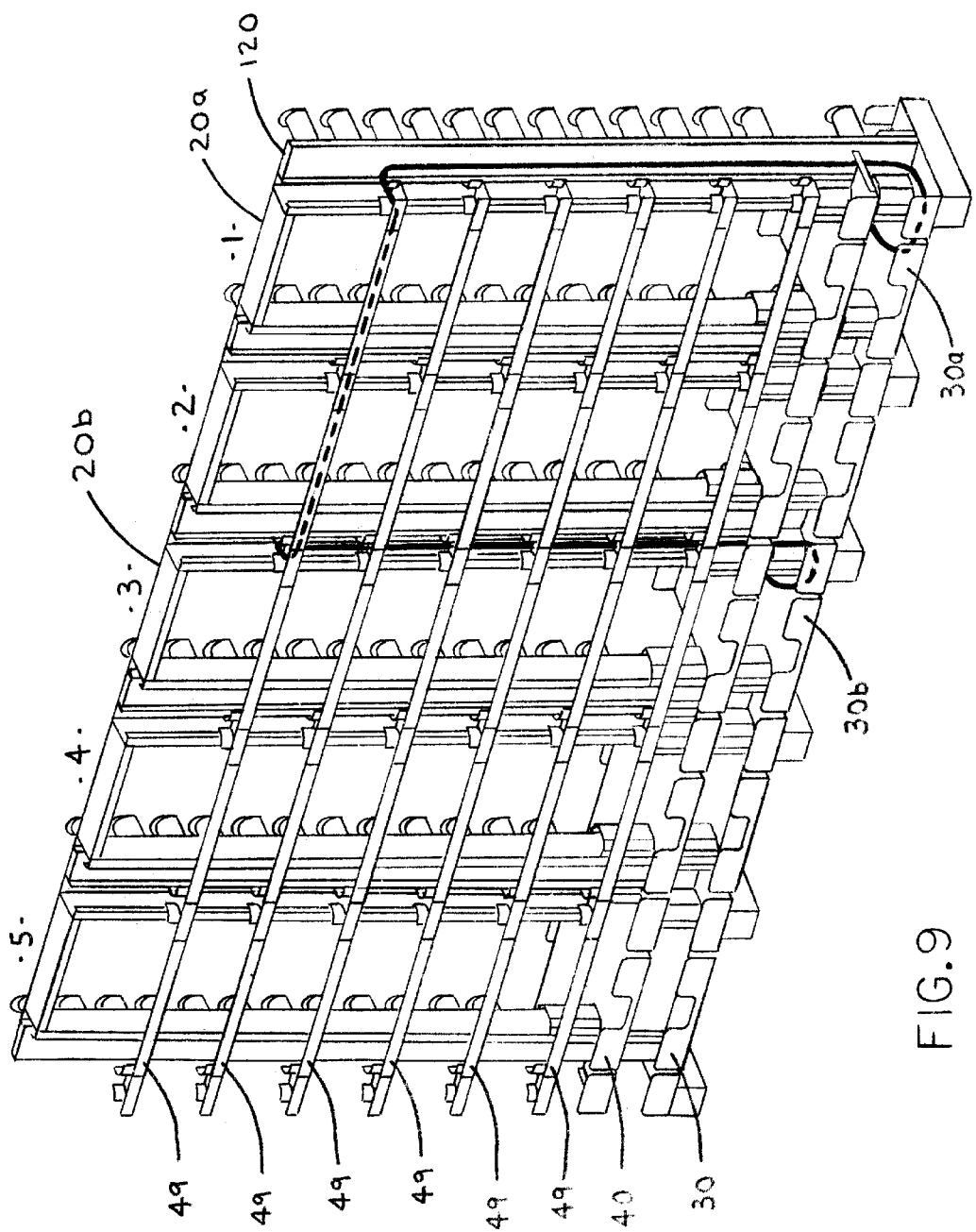
FIG. 9 is a perspective view of a series of cable management systems according to the invention.

In practice, a series of systems 10 are installed side-by-side, as depicted in FIGS. 8 and 9, which illustrate the multiple cable pathway options made possible by the various horizontal and vertical cable pathways of the system. FIG. 8, depicting the first surface of a series of cable management systems 10 as they would be installed on-site, shows the primary cable troughs 35, 37 and 45, 47 aligned horizontally with similar cable troughs on adjacent systems to define upper and lower primary horizontal cable pathways on, respectively, the first and second surfaces of the system 10. Likewise, FIG. 9, depicting the second surface of a series of cable management systems 10 as they would be installed on-site, illustrates how the plurality of transverse cable troughs 49 are horizontally aligned with similar transverse cable troughs 49 on adjacent systems 10, defining, a plurality of secondary horizontal cable pathways traversing the second surface of the system 10. Cable may pass through the central openings 29, 39 in the cable trough assemblies 30, 40 allowing cable to be routed to and from any of the primary or secondary horizontal cable pathways on the first and second surfaces of the system 10. The aperture 65 in the mounting brackets 52, 54 allows cable that terminates in a given enclosure 50 to be passed through the aperture to the second surface of the system 10 and routed horizontally along one of the multiple secondary horizontal cable pathways defined by the transverse cable troughs 49. The combination of the four primary horizontal cable pathways and the multiple secondary horizontal cable pathways, interconnected by the primary and vertical cable pathways and the aperture 65 and trough assembly openings 29, 39 provide a great many options for routing cable, enabling the system to carry and manage a very high density of cables with minimal cable congestion.

Figure 10:
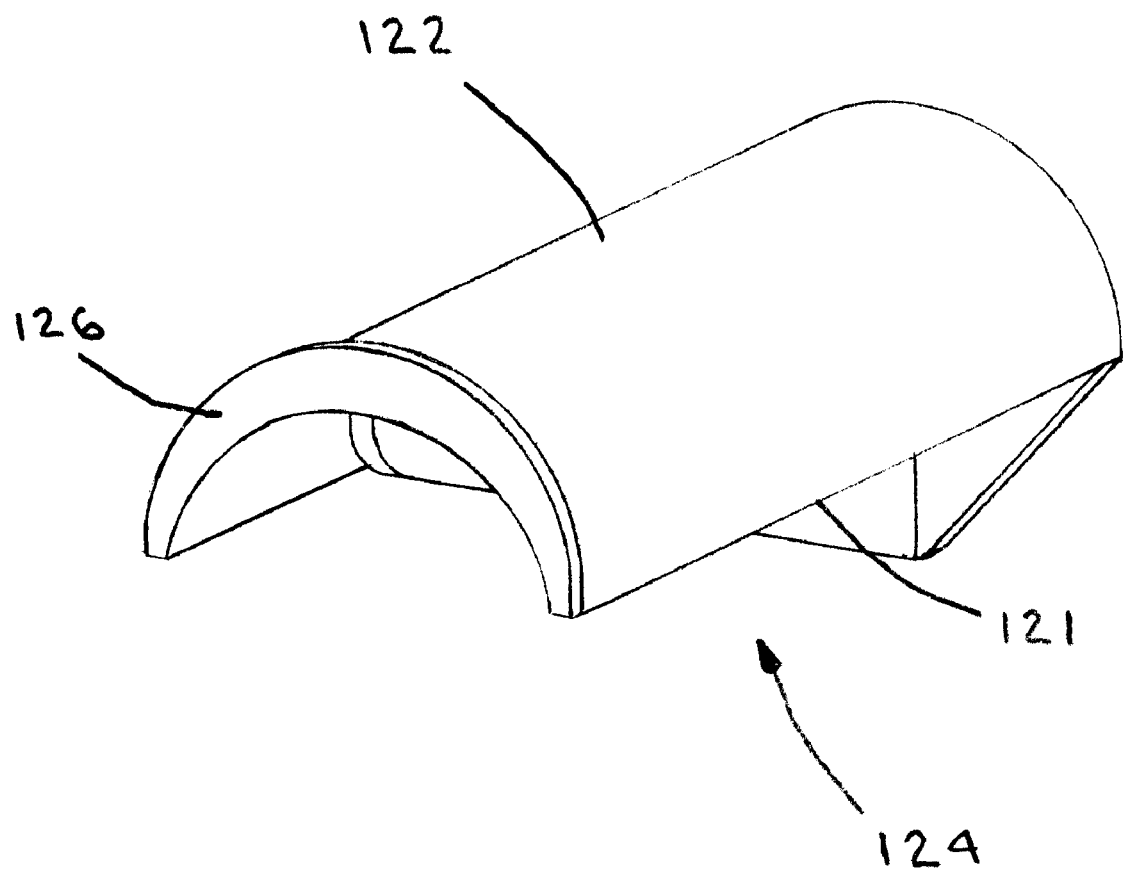
FIG. 10 is a detailed view of a slack management spool according to the invention.

The cable management system. 10 preferably includes a slack cable management system 120, a preferred embodiment of which is illustrated in FIGS. 1, 2, 5 and 8–10. In a preferred embodiment, the slack management system 120 includes a slack management panel 122, secured to the frame 20, preferably between adjacent systems, as depicted in FIG. 8. Locating the panel 122 between each of the adjacent systems 10, as illustrated in FIG. 8, insures that the slack management system 120 will located close to the termination points of both ends of a fiver optic cable traversing the systems. In a preferred embodiment, the panel is approximately 5 inches wide. A plurality of slack management spools 124 are secured to the slack management panel 122 and are used to hold loops of slack cable, although, alternatively, the spools could be secured directly to the frame 20. The slack management spools 124 have an elongate, substantially half-cylindrical shaft 121, having a curved upper surface 127 for contacting the cable. Typically, the spools 124 have a radius of about 1.5" to impart bend radius control to prevent excessive bending of the loop of slack cable passing over the spool 124, since excessive bending of fiber optic cable may cause cable breakage and will, over time, damage the cable and overall performance of the cable. The combination of the curved cable contacting surface 127, and the substantially half-cylindrical shaft create a substantially semi-circular or crescent-shaped cross-section, as shown in FIG. 10. The half-cylinder shape of the slack management spools 124 provides greater clearance for cable passing over the slack management spool 124 immediately below, thereby allowing the center-to-center distance between spools 124 to be decreased without impairing the ability of a field technician to access the cable looped over a given spool and without decreasing the amount of cable that may be looped over a given spool. Accordingly, more spools may be located within the same area as compared to fully cylindrical spools, thereby allowing more slack cable to contained within the same area, allowing for higher connection density and providing more options for placement of slack cable, allowing the field technician to efficiently manage slack cable without unduly stretching the cable or creating excessively large loops of slack cable that may interfere with passage of other cable.

A main spool 125 has a fully cylindrical elongate shaft 121 to provide bend radius control for cable routed over or under the master spool 125. An end flange 126 on each slack management spool 124 and the main spool 125 prevents coils of cable from slipping off. Slack management spools 124 are spaced at regular intervals vertically along the slack management panel 122. In a preferred embodiment, slack management spools 124 are removably secured to slack management panel 122 by snap fittings 130 that cooperate with a mounting aperture (not shown) in the slack management panel 122, although any conventional means of attachment may be used to secure the slack management spools 124 to the slack management panel 122.

FIGS. 8 and 9 illustrate the operation of the cable management system 120, showing a cable 130 emerging from an enclosure 50a located on frame 20a, passing downwards and looping upwards over a slack management spool 124, passing downwards and under the master spool 125, through trough assembly 30a, then upwards to transverse trough 49, along transverse trough 49 to frame 20b, downwards to and through trough assembly 30b and upwards to enclosure 50b.

Figure 11:
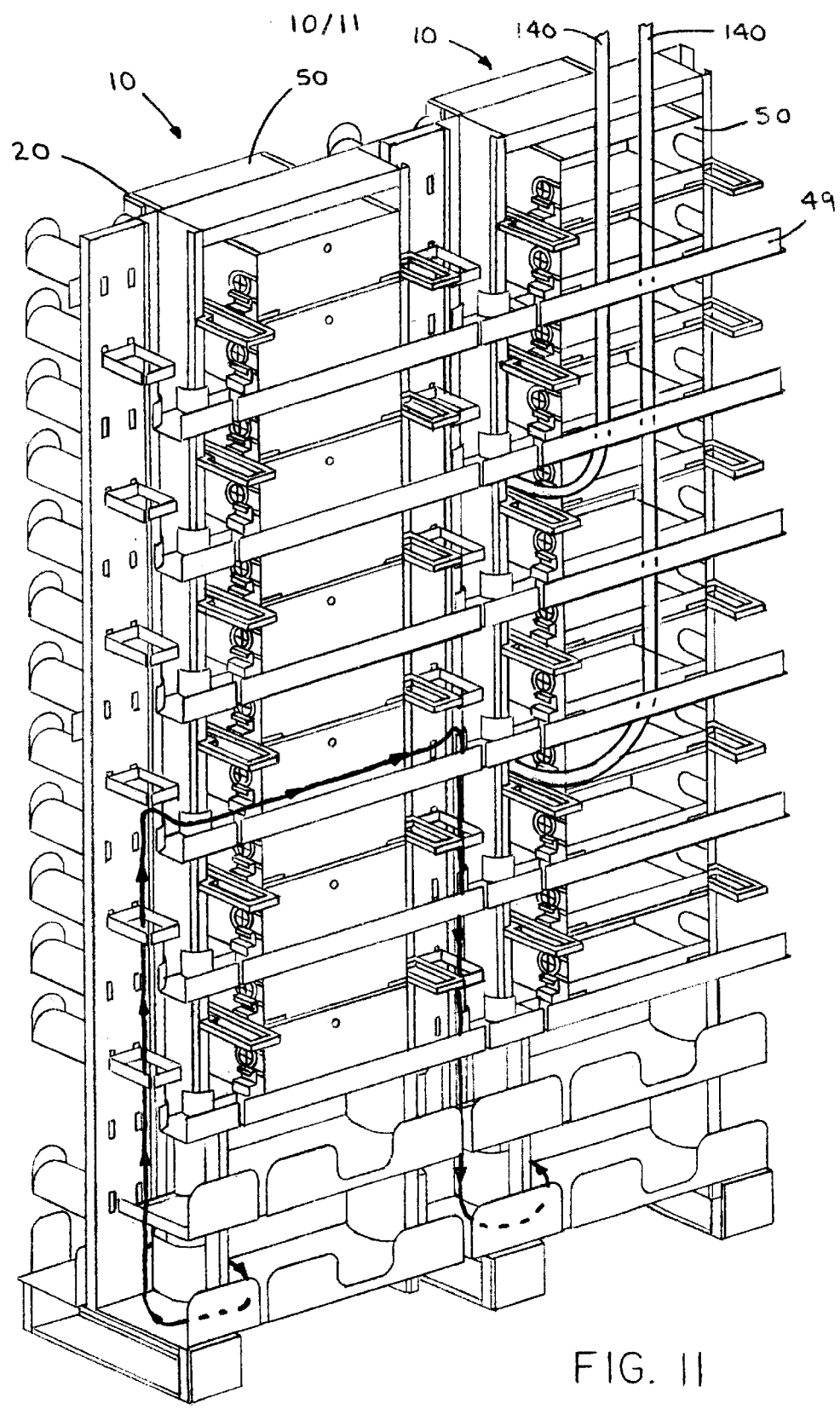
FIG. 11 is a top view of the cable management system according to the invention.
Figure 12:
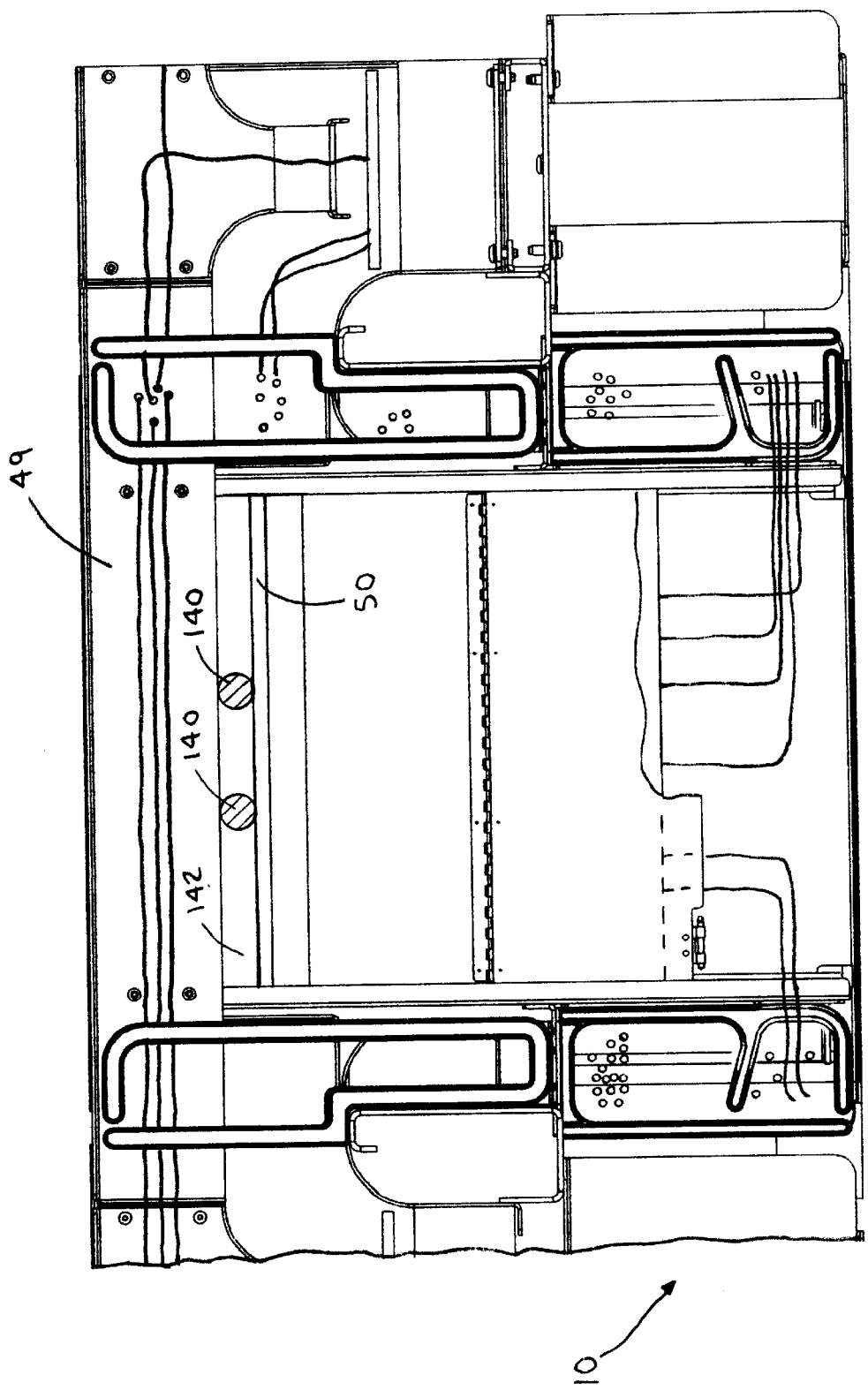
FIG. 12 is a perspective view of the second surface of a cable management system according to the invention.

FIGS. 11 and 12 show a preferred embodiment of the system including a channel 142 defined between the enclosure 50 and an adjacent transverse trough 49. Although the enclosure 50 may substantially abut the adjacent transverse trough 49, alternatively, the enclosure 50 may be inwardly spaced from the adjacent transverse trough 49 to define a channel 142 to accommodate cable 140 that is, for example, routed above the system 10, although the channel may accommodate cable routed anywhere within the system. By way of example only, such cable may include intra-facility cable that is routed across the ceiling of the room in which the system 10 is located, but may include any type of cable routed within or above the system.

Preferred embodiments of the present invention have been described herein. It is to be understood that modifications and changes can be made without departing from the true scope and spirit of the invention, as defined by the following claims which are to be interpreted and understood in view of the foregoing.

We claim:

1. A cable management system, comprising:
   an open frame having a pair of sidewalls extending vertically, the sidewalls connected at a first end by a base and at a second end by a top wall;
   a plurality of enclosures secured to the sidewalls;
   at least one cable fanning guide secured to at least one enclosure to control routing of cable emerging from the enclosure;
   a plurality of cable rings spaced vertically along at least one of the sidewalls, defining a vertical cable pathway;
   at least one cable trough assembly secured to the frame, the cable trough assembly defining, with cable troughs of contiguous other systems, a horizontal cable pathway.

2. The system of claim 1, wherein the enclosures are secured to the sidewalls by mounting brackets, the mounting brackets having a universal mounting pattern that enables the mounting bracket to be bolted directly to commercially available frames.

3. The system of claim 2, wherein the mounting bracket may be bolted to both EIA/TIA and WECO frames.

4. The system of claim 1, wherein the enclosures are secured to and between the sidewalls by mounting brackets, the mounting brackets having a universal mounting pattern that enables the mounting bracket to be bolted directly to commercially available frames.

5. The system of claim 1, wherein the enclosures are secured to and between the sidewalls by mounting brackets, the mounting brackets having a first and second leg, connected at their ends by first and second cross-pieces, defining a central aperture through which cable may pass through the frame.

6. The system of claim 5, wherein the mounting brackets include bend radius control means to limit the bend radius of cable passing through the central aperture.

7. The system of claim 1, wherein the enclosures have two opposed walls, and the at least one cable fanning guide is secured to at least one of the opposed walls.

8. The system of claim 7, wherein at least one fanning guide is secured to both of the opposed walls.

9. The system of claim 1, wherein the cable rings have first and second legs, the legs joined at a first end by a base, and at a second end by a cross-piece, defining a channel through which cable is routed, the channels of adjacent cable rings defining the vertical cable pathway.

10. The system of claim 9, wherein the cable rings are secured to the frame.

11. The system of claim 9, wherein the cable rings are secured to at least one of the mounting brackets.

12. The system of claim 1, wherein the cable rings have first and second legs joined at a first end by a base, the first leg having a terminal projection extending in the direction of the second leg and an intermediate projection located between the base and the terminal extension, extending in the direction of the second leg, defining first and second channels for routing cable, the channels defining the vertical cable pathway.

13. The system of claim 12, wherein tho cable rings are secured to the frame.

14. The system of claim 12, wherein the cable rings are secured to at least one of the mounting brackets.

15. The system of claim 12, wherein the terminal projection and the intermediate projection are substantially parallel to each other and are substantially perpendicular to the first leg.

16. The system of claim 12, wherein the terminal projection is substantially perpendicular to the first leg and the intermediate projection is not parallel to the terminal projection.

17. The system of claim 1, wherein the frame has first and second surfaces and the at least one cable trough assembly defines a first cable trough on the first surface of the frame and a second cable trough on the second surface of the frame, the first and second cable troughs defining, with similar cable troughs of contiguous other systems, first and second primary horizontal cable pathways.

18. The system of claim 1, further comprising at least one transverse cable trough, the at least one transverse cable trough defining, with transverse cable troughs of contiguous other systems, at least one secondary horizontal cable pathway.

19. The system of claim 1, further comprising a plurality of transverse cable troughs spaced vertically along the second surface of the frame, the transverse cable troughs defining, with transverse cable troughs of contiguous other systems, a plurality of secondary horizontal cable pathways.

20. The system of claim 19, wherein each of the enclosures is inwardly spaced from the adjacent plurality of transverse troughs defining a channel through which cable may be routed vertically to or from the cable pathways of the system.

21. The system of claim 1, further comprising a slack cable management system, the slack cable management system comprising:
at least one panel attached to at least one of the sidewalls of the frame;
a plurality of spools spaced vertically along the panel for receiving slack cable;
the spools having a half cylindrical, elongate shaft, with an end flange.

22. The system of claim 1, further comprising a slack cable management system, the slack cable management system comprising:
a plurality of spools attached to and spaced vertically along at least one of the sidewalls of the frame for receiving slack cable;
the spools having a half cylindrical, elongate shaft, with an end flange.

23. A cable management system, comprising:
an open frame having a pair of sidewalls extending vertically, the sidewalls connected at a first end by a base and at a second end by a top wall, defining a first and second surface of the system;
a plurality of enclosures secured to the sidewalls;
at least one cable fanning guide secured to at least one enclosure to control routing of cable emerging from the enclosure;
a plurality of cable rings spaced vertically along at least one of the sidewalls, defining a primary vertical cable pathway on the first surface of the system;
at least one cable trough assembly secured to the frame, the cable trough assembly defining, with cable troughs of contiguous other systems, at least one primary horizontal cable pathway, and;
at least one transverse cable trough located on the second surface of the system, the at least one transverse cable trough defining, with transverse cable troughs of contiguous other systems, at least one secondary horizontal cable pathway.

24. The system of claim 23, wherein the enclosures are secured to the sidewalls by mounting brackets, the mounting brackets having a universal mounting pattern that enables the mounting bracket to be bolted directly to commercially available frames.

25. The system of claim 24, wherein the mounting bracket may be bolted to both EIA/TIA and WECO frames.

26. The system of claim 23, wherein the enclosures are secured to and between the sidewalls by mounting brackets, the mounting brackets having a universal mounting pattern that enables the mounting bracket to be bolted directly to commercially available frames.

27. The system of claim 26, wherein the enclosures are secured to and between the sidewalls by mounting brackets the mounting brackets having a first and second leg, connected at their ends by first and second cross-pieces, defining a central aperture through which cable may pass through the frame.

28. The system of claim 27, wherein the mounting brackets include bend radius control means to limit the bend radius of cable passing through the central aperture.

29. The system of claim 23, wherein the enclosures have two opposed walls, and the at least one cable fanning guide is secured to at least one of the opposed walls.

30. The system of claim 29, wherein at least one fanning guide is secured to both of the opposed walls.

31. The system of claim 23, wherein the cable rings have first and second legs, the legs joined at a first end by a base, and at a second end by a cross-piece, defining a channel through which cable is routed, the channels of adjacent cable rings defining the vertical cable pathway.

32. The system of claim 31, wherein the cable rings are secured to the frame.

33. The system of claim 31, wherein the cable rings are secured to at least one of the mounting brackets.

34. The system of claim 23, wherein the cable rings have first and second legs joined at a first end by a base, the first leg having a terminal projection extending in the direction of the second leg and an intermediate projection located between the base and the terminal extension, extending in the direction of the second leg, defining first and second channels for routing cable, the channels defining the vertical cable pathway.

35. The system of claim 34, wherein the cable rings are secured to the frame.

36. The system of claim 34, wherein the cable rings are secured to at least one of the mounting brackets.

37. The system of claim 34 wherein the terminal projection and the intermediate projection are substantially parallel to each other and substantially perpendicular to the first leg.

38. The system of claim 34, wherein the terminal projection is substantially perpendicular to the first leg and the intermediate projection is not parallel to the terminal projection.

39. A cable management system, comprising:
an open frame having a pair of sidewalls extending vertically, the sidewalls connected at a first end by a base and at a second end by a top wall, defining a first and second surface of the system;
a plurality of enclosures secured to the sidewalls;
at least one cable fanning guide secured to at least one enclosure to control routing of cable emerging from the enclosure;
a plurality of cable rings spaced vertically along at least one of the sidewalls on the first surface of the system, defining a primary vertical cable pathway on the first surface of the system;
a second plurality of cable rings spaced vertically along at least one of the sidewalls on the second surface of the system, defining a secondary vertical cable pathway on the second surface of the system;
a plurality of cable trough assemblies secured to the frame, the cable trough assemblies defining an opening through which cable may be routed through the frame, each cable trough assembly comprising at least one cable trough on the first surface of the system and at least one cable trough on the second surface of the system, the cable troughs defining, with cable troughs of contiguous other systems, a plurality of primary horizontal cable pathways, and;
a plurality of transverse cable trough vertically spaced at intervals on the second surface of the system, the plurality of transverse cable troughs defining, with transverse cable troughs of contiguous other systems, a plurality of secondary horizontal cable pathway.

40. The system of claim 39, wherein the enclosures are secured to the sidewalls by mounting brackets, the mounting brackets having a universal mounting pattern that enables the mounting bracket to be bolted directly to commercially available frames.

41. The system of claim 40, wherein the mounting bracket may be bolted to both EIA/TIA and WECO frames.

42. The system of claim 39, wherein the enclosures are secured to and between the sidewalls by mounting brackets, the mounting brackets having a universal mounting pattern that enables the mounting bracket to be bolted directly to commercially available frames.

43. The system of claim 42, wherein the enclosures are secured to and between the sidewalls by mounting brackets, the mounting brackets having a first and second leg, connected at their ends by first and second cross-pieces, defining a central aperture through which cable may pass through the frame.

44. The system of claim 43, wherein the mounting brackets include bend radius control means to limit the bend radius of cable passing through the central aperture.

45. The system of claim 39, wherein the enclosures have two opposed walls, and the at least one cable fanning guide is secured to at least one of the opposed walls.

46. The system of claim 45, wherein at least one fanning guide is secured to both of the opposed walls.

47. The system of claim 39, wherein the cable rings have first and second legs, the legs joined at a first end by a base, and at a second end by a cross-piece, defining a channel through which cable is routed, the channels of adjacent cable rings defining the vertical cable pathway.

48. The system of claim 47, wherein the cable rings are secured to the frame.

49. The system of claim 47, wherein the cable rings are secured to at least one of the mounting brackets.

50. The system of claim 39, wherein the cable rings have first and second legs joined at a first end by a base, the first leg having a terminal projection extending in the direction of the second leg and an intermediate projection located between the base and the terminal extension, extending in the direction of the second leg, defining first and second channels for routing cable, the channels defining the vertical cable pathway.

51. The system of claim 50, wherein the cable rings are secured to the frame.

52. The system of claim 50, wherein the cable rings are secured to at least one of the mounting brackets.

53. The system of claim 50 wherein the terminal projection and the intermediate projection are substantially parallel to each other and substantially perpendicular to the first leg.

54. The system of claim 50, wherein the terminal projection is substantially perpendicular to the first leg and the intermediate projection is not parallel to the terminal projection.

55. The system of claim 39, wherein each of the enclosures is inwardly spaced from the adjacent plurality of transverse troughs defining a channel through which cable may be routed vertically to or from the cable pathways of the system.

* * * * *